(12) United States Patent
Yang et al.

(10) Patent No.: US 11,691,506 B2
(45) Date of Patent: Jul. 4, 2023

(54) SHIFTING MECHANISM FOR A VEHICLE POWER TRANSFER UNIT

(71) Applicant: GKN Automotive Limited, Birmingham (GB)

(72) Inventors: Lei Yang, Novi, MI (US); Brent Peura, Farmington, MI (US); Kazunobu Takeshita, West Bloomfield, MI (US)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/487,043

(22) Filed: Sep. 28, 2021

(65) Prior Publication Data

US 2022/0097519 A1   Mar. 31, 2022

Related U.S. Application Data

(60) Provisional application No. 63/085,737, filed on Sep. 30, 2020.

(51) Int. Cl.
*B60K 23/08* (2006.01)
*B60K 17/344* (2006.01)

(52) U.S. Cl.
CPC ........ *B60K 23/0808* (2013.01); *B60K 17/344* (2013.01); *B60K 2023/0841* (2013.01)

(58) Field of Classification Search
CPC .......... B60K 17/344; B60K 2023/0858; B60K 23/08; B60K 17/28; B60K 17/3462; B60K 23/0808
See application file for complete search history.

(56) References Cited

U.S. PATENT DOCUMENTS

| | | | |
|---|---|---|---|
| 2,101,130 A | 12/1937 | Christman | |
| 3,323,844 A | 6/1967 | Hedstrom | |
| 4,582,160 A | 4/1986 | Weismann et al. | |
| 4,601,359 A | 7/1986 | Weismann et al. | |
| 4,721,011 A | 1/1988 | Kubo et al. | |
| 4,782,721 A * | 11/1988 | Dick | B60K 17/3467 74/665 GA |
| 4,915,191 A | 4/1990 | Kotajima | |
| 4,969,532 A | 11/1990 | Oyama et al. | |

(Continued)

FOREIGN PATENT DOCUMENTS

| | | |
|---|---|---|
| DE | 2138134 A1 | 2/1973 |
| WO | WO2010103101 A1 | 9/2010 |

*Primary Examiner* — Joseph Brown
*Assistant Examiner* — Gregory T Prather
(74) *Attorney, Agent, or Firm* — Jennifer M. Brumbaugh; Reising Ethington P.C.

(57) ABSTRACT

A vehicle power transfer unit assembly comprises an input shaft, an intermediate shaft at least partially surrounding the input shaft, a central shaft adjacent the input shaft, a peripheral shaft at least partially surrounding the central shaft, a first shift collar, and a second shift collar. The first shift collar is operable between a first position where torque is transferred from the input shaft to the intermediate shaft and a second position where torque is not transferred from the input shaft to the intermediate shaft. The second shift collar is operable between a third position where torque is transferred from the input shaft to the peripheral shaft and a fourth position where torque is transferred from the input shaft to the central shaft.

19 Claims, 9 Drawing Sheets

(56) References Cited

U.S. PATENT DOCUMENTS

| | | |
|---|---|---|
| 5,094,655 A | 3/1992 | Sato |
| 5,102,378 A | 4/1992 | Gobert |
| 5,199,325 A | 4/1993 | Reuter et al. |
| 5,284,068 A | 2/1994 | Frost |
| 5,562,192 A | 10/1996 | Dick |
| 5,795,037 A | 8/1998 | Hagelthorn |
| 5,884,526 A | 3/1999 | Fogelberg |
| 5,997,428 A | 12/1999 | Kagata et al. |
| 6,001,041 A | 12/1999 | Sawase et al. |
| 6,009,609 A | 1/2000 | Hanno |
| 6,082,514 A | 7/2000 | Averill |
| 6,117,038 A | 9/2000 | Nishiji et al. |
| 6,234,289 B1 | 5/2001 | Baker et al. |
| 6,244,751 B1 | 6/2001 | Rode |
| 6,422,369 B1 | 7/2002 | McCalla |
| 6,422,967 B1 | 7/2002 | Krisher |
| 6,432,021 B1 | 8/2002 | Averill |
| 6,460,671 B1 | 10/2002 | Karambelas et al. |
| 6,517,462 B2 | 2/2003 | Borgan et al. |
| 6,557,660 B2 | 5/2003 | Averill et al. |
| 6,598,722 B2 | 7/2003 | Pugliese et al. |
| 6,605,018 B2 | 8/2003 | Palazzolo |
| 6,824,487 B2 | 11/2004 | Williams et al. |
| 6,830,142 B2 | 12/2004 | Weilant |
| 6,902,017 B2 | 6/2005 | Ohashi |
| 6,938,517 B2 | 9/2005 | Cook et al. |
| 7,004,874 B2 | 2/2006 | Mizon et al. |
| 7,127,967 B2 | 10/2006 | Cook et al. |
| 7,140,268 B2 | 11/2006 | Leposky et al. |
| 7,150,694 B2 | 12/2006 | Mizon et al. |
| 7,155,827 B2 | 1/2007 | Stuart et al. |
| 7,717,525 B2 | 5/2010 | White et al. |
| 7,793,767 B2 | 9/2010 | Heravi et al. |
| 8,132,638 B2 | 3/2012 | Martus et al. |
| 8,292,776 B1 | 10/2012 | Higman et al. |
| 8,313,407 B2 | 11/2012 | Ekonen et al. |
| 8,382,633 B2 | 2/2013 | Cooper et al. |
| 8,469,854 B1 | 6/2013 | Downs et al. |
| 8,584,785 B2 | 11/2013 | Marsh et al. |
| 8,608,611 B2 | 12/2013 | Ekonen et al. |
| 8,661,942 B2 | 3/2014 | Schwekutsch et al. |
| 8,720,633 B2 | 5/2014 | Grutter et al. |
| 8,986,148 B2 | 3/2015 | Downs et al. |
| 9,120,374 B2 | 9/2015 | Peura et al. |
| 11,021,057 B2 * | 6/2021 | Jain .................. B60K 17/08 |
| 2003/0057007 A1 | 3/2003 | Stevens |
| 2004/0259676 A1 | 12/2004 | Turner et al. |
| 2005/0215376 A1 * | 9/2005 | Williams .............. F16D 41/086 |
| | | 475/198 |
| 2008/0230295 A1 | 9/2008 | Grogg |
| 2010/0058890 A1 | 3/2010 | Palazzolo et al. |
| 2011/0308875 A1 | 12/2011 | Marsh et al. |
| 2012/0083380 A1 | 4/2012 | Reed et al. |
| 2012/0142474 A1 | 6/2012 | Troennberg et al. |
| 2012/0260758 A1 | 10/2012 | Arai |
| 2013/0066529 A1 * | 3/2013 | Murayama .......... F16H 61/0437 |
| | | 701/62 |
| 2013/0199884 A1 | 8/2013 | Eder et al. |
| 2013/0303326 A1 | 11/2013 | Downs et al. |
| 2014/0224066 A1 | 8/2014 | Cook et al. |
| 2015/0053027 A1 * | 2/2015 | Downs ................... F16D 13/58 |
| | | 192/94 |
| 2016/0061274 A1 | 3/2016 | Engerer et al. |
| 2016/0131240 A1 | 5/2016 | Cooper |

* cited by examiner

SHIFTING MECHANISM FOR A VEHICLE POWER TRANSFER UNIT

REFERENCE TO RELATED APPLICATIONS

This application claims the benefit of U.S. Provisional Application Ser. No. 63/085,737 filed Sep. 30, 2020. The entire content of this priority application is incorporated herein by reference in its entirety.

TECHNICAL FIELD

The present disclosure relates generally to power transfer units for vehicles.

BACKGROUND

In general, vehicle drivelines transmit torque from a vehicle's engine to its wheels. Automotive drivelines sometimes include power transfer units (PTUs, also known as power take-off units) for selectively distributing torque among shafts in the drivelines. The PTUs are often equipped in four-wheel and all-wheel automotive driveline configurations. A power transfer unit typically consists of a housing that encloses and supports gears, shafts, and bearings. Shifting may occur between engagement of various components (e.g., gears, shafts, etc.) to selectively modify the torque distributed in the driveline. Some PTUs (e.g., as shown in FIG. 13) may include two shift forks 17, one operating a first shift collar 19 and the other operating a second shift collar 21, with each shift fork 17 being driven by a separate one of two motor-actuators 23, 25.

This section provides background information related to the present disclosure which is not necessarily prior art.

SUMMARY

In at least some implementations, a vehicle power transfer unit assembly comprises an input shaft, an intermediate shaft at least partially surrounding the input shaft, a central shaft adjacent the input shaft, a peripheral shaft at least partially surrounding the central shaft, a proximal shift collar, and a distal shift collar. The proximal shift collar is operable between a first position where torque is transferred from the input shaft to the intermediate shaft and a second position where torque is not transferred from the input shaft to the intermediate shaft. The distal shift collar is operable between a third position where torque is transferred from the input shaft to the peripheral shaft and a fourth position where torque is transferred from the input shaft to the central shaft.

Implementations of the disclosure may include one or more of the following optional features. In some implementations, the vehicle power transfer unit assembly includes at least one shift fork operable to shift the proximal shift collar between the first position and the second position and the distal shift collar between the third position and the fourth position. The vehicle power transfer unit assembly may include an actuator that moves the at least one shift fork back and forth.

The vehicle power transfer unit assembly may include a proximal spring configured to bias the proximal shift collar toward the first position and a distal spring configured to bias the distal shift collar toward the third position.

The proximal shift collar may include (i) a first inner spline configured to meshingly engage with a first outer spline of the input shaft and (ii) a second outer spline configured to meshingly engage with a second inner spline of the intermediate shaft. The distal shift collar may include (i) a third inner spline configured to meshingly engage with the first outer spline of the input shaft and (ii) a third outer spline configured to meshingly engage with a fourth inner spline of the peripheral shaft. The distal shift collar may include a first face spline at a distal end of the distal shift collar and the central shaft may include a second face spline at a proximal end of the central shaft configured to meshingly engage with the first face spline.

Another aspect of the disclosure provides a vehicle power transfer unit assembly comprises an input shaft configured to receive a torque, an intermediate shaft at least partially surrounding the input shaft, a central shaft adjacent the input shaft and configured to transfer the torque to a differential gear assembly, a peripheral shaft at least partially surrounding the central shaft and configured to transfer the torque to the differential gear assembly, a proximal shift collar, and a distal shift collar. The proximal shift collar is operable between a first position where torque is transferred from the input shaft to the intermediate shaft via a spline engagement and a second position where torque is not transferred from the input shaft to the intermediate shaft. The distal shift collar is operable between a third position where torque is transferred from the input shaft to the peripheral shaft via a spline engagement and a fourth position where torque is transferred from the input shaft to the central shaft. This aspect may include one or more of the following optional features.

In some implementations, the vehicle power transfer unit assembly includes at least one shift fork operable to shift the proximal shift collar between the first position and the second position and the distal shift collar between the third position and the fourth position. The vehicle power transfer unit assembly may include an actuator that moves the at least one shift fork back and forth.

The vehicle power transfer unit assembly may include a proximal spring configured to bias the proximal shift collar toward the first position and a distal spring configured to bias the distal shift collar toward the third position.

The proximal shift collar may include (i) a first inner spline configured to meshingly engage with a first outer spline of the input shaft and (ii) a second outer spline configured to meshingly engage with a second inner spline of the intermediate shaft. The distal shift collar may include (i) a third inner spline configured to meshingly engage with the first outer spline of the input shaft and (ii) a third outer spline configured to meshingly engage with a fourth inner spline of the peripheral shaft. The distal shift collar may include a first face spline at a distal end of the distal shift collar and the central shaft may include a second face spline at a proximal end of the central shaft configured to meshingly engage with the first face spline.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Referring to FIGS. 1-12, a power transfer unit (PTU) assembly 10 for a vehicle is generally shown. The PTU assembly 10 may be implemented in an automotive vehicle or any other suitable vehicle. The PTU assembly 10 may satisfy torque and durability requirements oftentimes imposed by automotive manufacturers. Hence, the torque duty cycle capacity of the PTU assembly 10 may be augmented. While illustrated by one embodiment in the figures, the PTU assembly 10 can have different designs and constructions in other embodiments, some of which are described below. Indeed, the exact design and construction of the PTU assembly 10 may depend on the particular application in which the PTU assembly 10 is installed. The applications can involve various steering, engine, and transmission components, and the accompanying packaging demands, all of which may dictate the design and construction of the PTU assembly 10. The PTU assembly 10 may be implemented in a front axle, a rear axle, or any suitable location of a vehicle.

Figure 13:
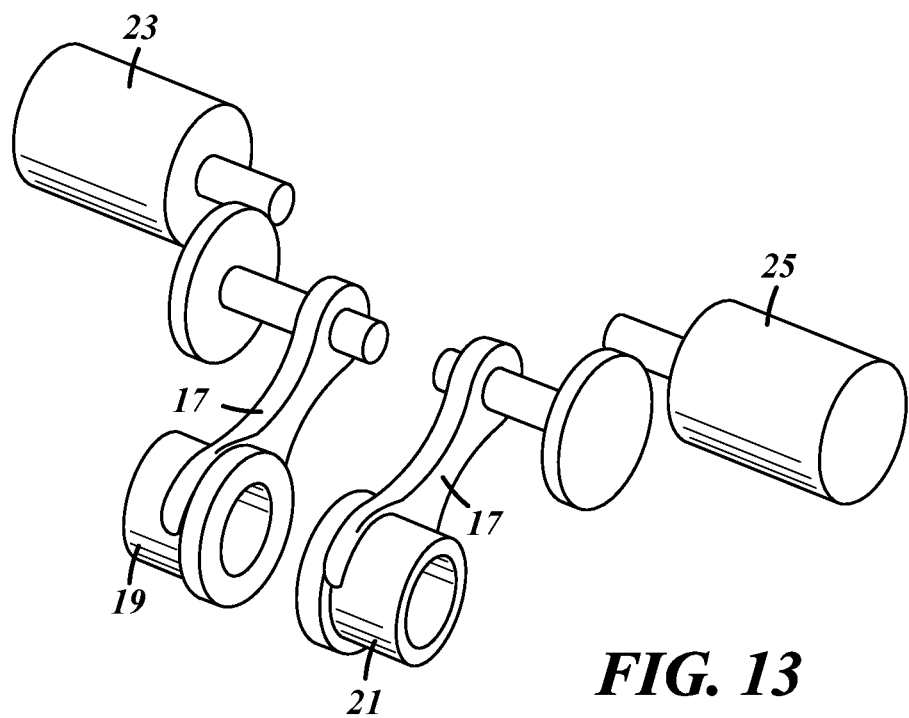
FIG. 13 is a diagrammatic view of a portion of an exemplary prior art PTU assembly including two shift forks and two motors.

In contrast, referring to FIG. 13, an exemplary PTU assembly may include two motors and two drive assemblies 23, 25 that manipulate two shift forks 17. That is, one motor and drive assembly 23 manipulates one shift fork 17 that operates a first shift collar 19, and the other motor and drive assembly 25 manipulates the other shift fork 17 that operates the second shift collar 21.

Figure 1:
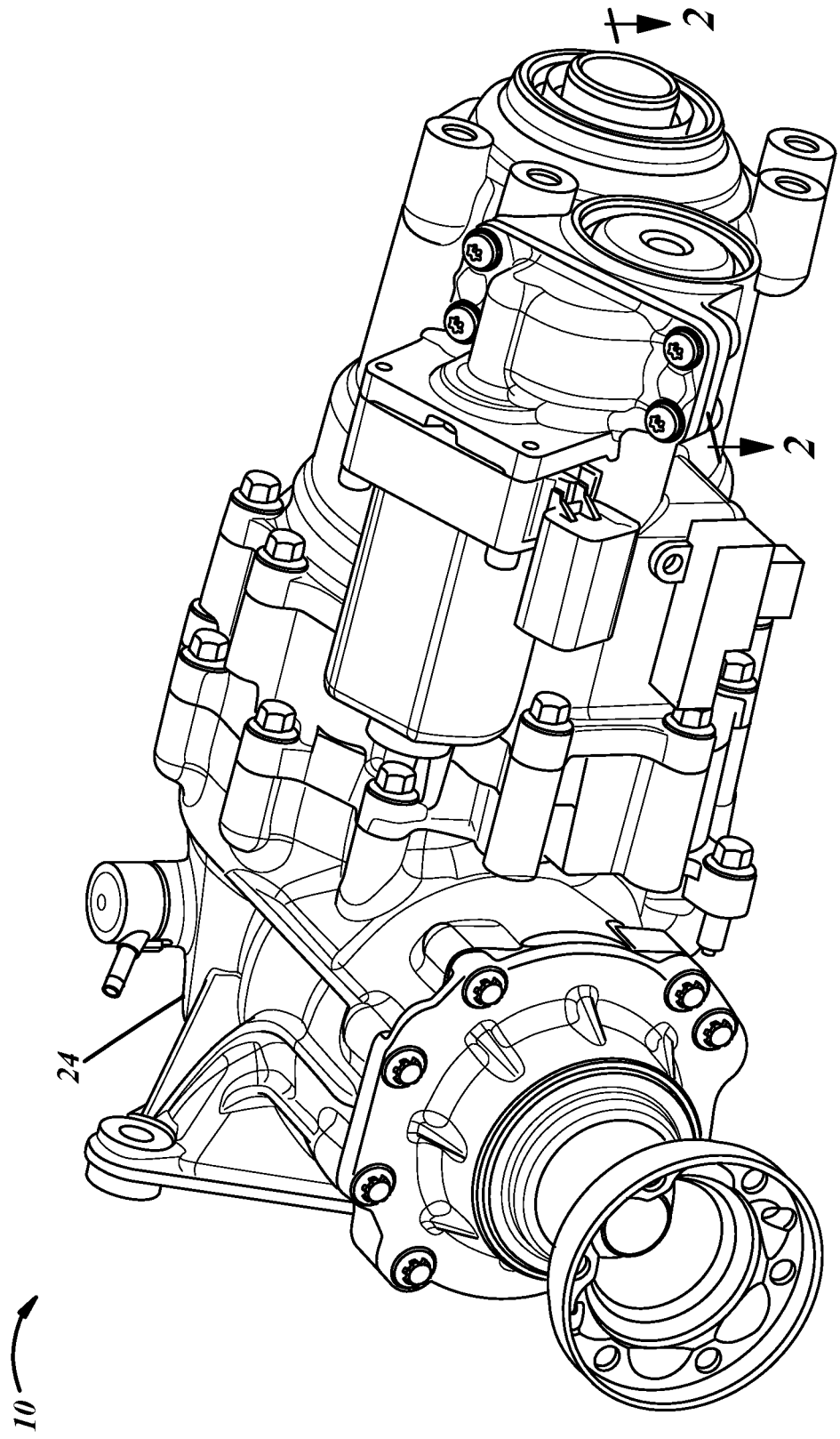
FIG. 1 is a perspective view of a power transfer unit (PTU) assembly in accordance with principles of the present disclosure.
Figure 2:
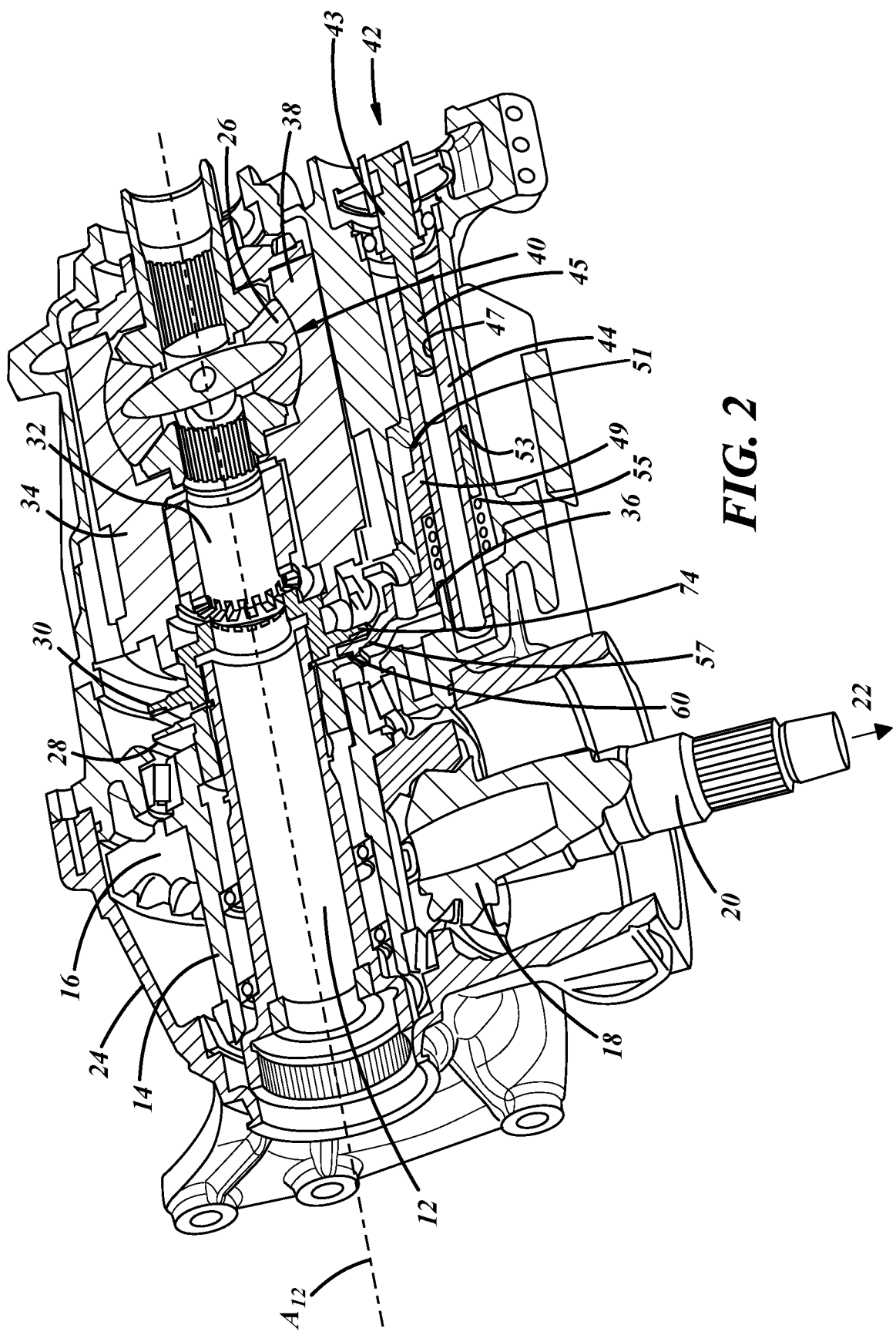
FIG. 2 is a cross-sectional view of the PTU assembly of FIG. 1 taken generally along line 2-2 in FIG. 1.

In the embodiment shown in FIGS. 1-12, the PTU assembly 10 is a multi-piece mechanism with components that work together in order to produce a desired torque output. In this embodiment, as shown in FIG. 2, the PTU assembly 10 includes an input shaft 12, an intermediate shaft 14, a ring gear 16, and an output gear 18 connected to an output shaft 20. Other components can include bearings, seals, and yet additional shafts and gears. A PTU housing, cover, and/or intermediate structure 24 composed of a metal or non-metallic material may enclose and support components of the PTU assembly 10.

Referring to FIGS. 1 and 2, the input shaft 12 may receive torque from a transmission, motor, or any other suitable device that drives rotation of the input shaft 12 about a central axis $A_{12}$. As used herein, "distal" refers to a location further from a center of the vehicle along the central axis $A_{12}$ and "proximal" refers to a location closer to the center of the vehicle along the central axis $A_{12}$. For example, referring to FIG. 2, a location furthest to the left is the most proximal and a location furthest to the right is the most distal. As will become apparent, the input shaft 12 selectively transfers the torque throughout various components of the PTU assembly 10. By selectively transferring the torque, the PTU assembly 10 may effectively control or modify the amount of torque that is delivered to wheels of the vehicle.

Referring to FIG. 2, the ring gear 16 may be rotationally coupled with the intermediate shaft 14, such that, as the intermediate shaft 14 rotates, the ring gear 16 likewise rotates. The ring gear 16 may be fixed to the intermediate shaft 14 in any suitable manner, such as welding, fasteners, spline connection, keyed connection, etc. The ring gear 16 is meshingly-engaged with the output gear 18, which may be a hypoid gear, and the ring gear 16 may drive rotation of the output gear 18. The output gear 18 is connected to the output shaft 20, which may connect to a second set of wheels 22, such as a rear set of wheels or a front set of wheels. As described in greater detail below, when the ring gear 16 drives rotation of the output gear 18, the output shaft 20 may transfer torque to the second set of wheels, causing them to rotate (i.e., in four-wheel drive). A variety of intermediate components may be connected between the output shaft 20 and the second set of wheels, as suitable.

With continued reference to FIG. 2, the PTU assembly 10 includes a differential gear subassembly 26, a proximal or first shift collar 28, a distal or second shift collar 30, a central shaft 32, a peripheral shaft 34, and at least one shift fork 36. The central shaft 32 may be positioned adjacent to the input shaft 12 and configured to transfer torque to the differential gear assembly 26, as described in more detail below. The differential gear subassembly 26 is positioned distal to the central shaft 32. The differential gear subassembly 26 includes a housing 38 and a plurality of differential gears 40 disposed within the housing 38. In some implementations, the housing 38 may be integrally formed with the peripheral shaft 34. In other implementations, the housing 38 may be separate from the peripheral shaft 34. The peripheral shaft 34 may surround at least part of the central shaft 32 and be configured to transfer torque to the differential gear assembly 26, as described in more detail below. The differential gears 40 may be engaged with one another to allow an outer wheel of the vehicle to rotate faster than an inner wheel of the vehicle during a turn.

Figure 9A:
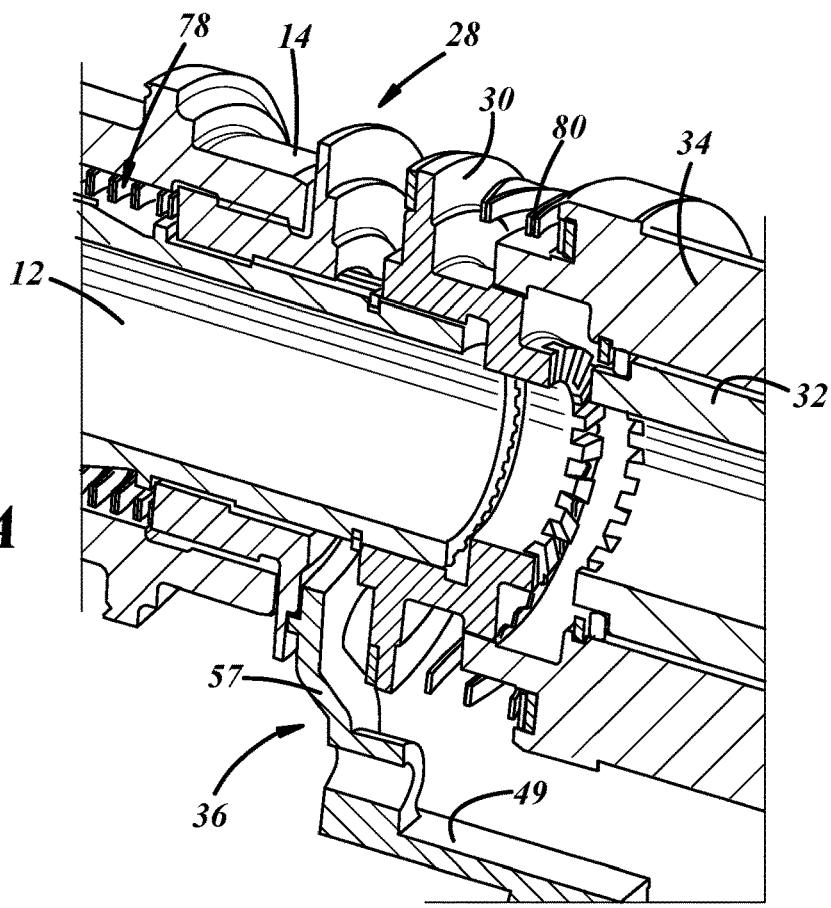
FIG. 9A is a cross-section view of part of the PTU assembly of FIG. 8 in a first position taken generally along line 9-9 in FIG. 8 with certain components removed to illustrate selected components.
Figure 9B:
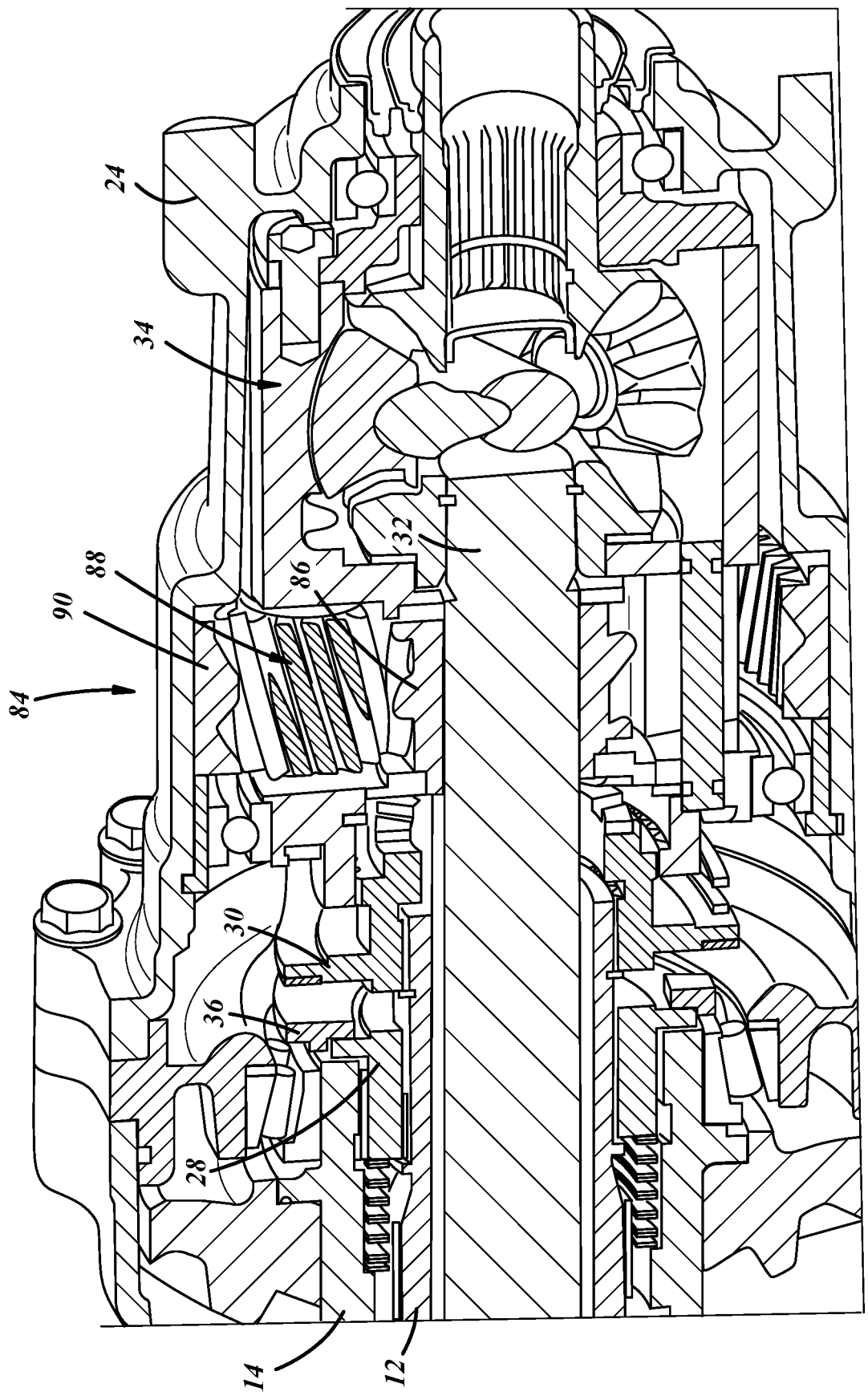
FIG. 9B is a cross-section view of the PTU assembly of FIG. 8 in the first position taken along line 9-9 in FIG. 8.

Referring to FIG. 9B, in some implementations, the PTU assembly 10 includes a planetary gear subassembly 84 adjacent and proximal to the differential gear subassembly 26, the planetary gear subassembly 84 including a sun gear 86 and surrounding planetary gears 88 that translate along an annulus gear 90. The planetary gears 88 may be embedded in the peripheral shaft 34, and the annulus gear 90 may be fixed to the PTU housing 24.

As shown in at least FIG. 2, the PTU assembly 10 may include an actuator 42 adjacent the peripheral shaft 34. The actuator 42, in at least some implementations, includes a motor 43 and a drive member 44 that is configured to move the shift fork 36 back and forth along a direction parallel to the central axis $A_{12}$. The motor 43 may include an output shaft 45 that rotates but does not move axial to move the drive member, which moves axially but does not rotate. The output shaft 45 is driven for rotation in both directions about an axis parallel to the central axis $A_{12}$. In the implementation shown, the drive member 44 is a cylindrical rod having a threaded opening 47 adapted to threadedly engage a threaded end of the output shaft 45. So arranged, rotation of the output shaft 45 in a first direction moves the drive member 44 away from the motor 43, and rotation of the output shaft 45 in a second direction moves the drive member 44 toward the motor 43. The drive member 44, in turn, is drivingly engaged with the shift fork 36 so that the shift fork 36 moves when driven by the actuator.

In the implementation shown, the shift fork 36 includes a base 49 having an opening into which the drive member 44 extends. A drive surface 51 on the base 49 (e.g. an end face of the base surrounding the opening in the base) of the shift fork 36 engages a driving surface 53 of the drive member 44 (e.g. a radially extending shoulder on the drive member 44) to move the shift fork 36 in the first direction (away from the motor 43 in the implementation shown). A coil spring 55 or other biasing member acts on the shift fork 36 to keep the drive surface 51 engaged with the driving surface 53 when the drive member 44 moves in the second direction to move the shift fork 36 in that same direction. As the spring 55 may move or help movement of the shift fork 36, the spring 55 may be considered to be part of the actuator. Thus, the shift fork 36 is positively driven by the drive member 44 in one direction and is biased in the other direction so that the shift fork 36 moves when the drive member 44 is moved in a direction that would otherwise separate the drive member 44 from the shift fork 36.

Of course, the shift fork 36 can be positively driven in both directions by the drive member 44, or the shift fork 36 may be directly coupled to the output shaft 45 which could then be considered to be the drive member 44, if desired. Further, the actuator 42 may include a linear actuator rather than a rotary drive motor (such as, but not limited to a pneumatic or hydraulic cylinder, or a electro-mechanical linear actuator like a belt or screw drive actuator, linear motor actuator, rack and pinion actuator, or the like), the output of the actuator 42 could be a ball screw or other rotary or linear driving element and need not be a rotated output shaft 45 as in the illustrated embodiment.

So that the shift fork 36 can drive the shift collars 28, 30 as the shift fork 36 is moved by the actuator 42, the shift fork 36 includes an arm 57 extending outwardly from the base 49 and engageable with the shift collars 28, 30. In at least some implementations, the arm 57 is received axially between the shift collars 28, 30 (relative to the central axis $A_{12}$), and in the implementation shown, outwardly extending flanges 60, 74 (described in more detail below) of the shift collars 28, 30 are arranged adjacent to each other and the arm 57 is received between the flanges 60, 74 of the shift collars 28, 30. Thus, movement of the shift fork 36 in the first direction engages the shift fork arm 57 with the flange 60 of the first shift collar 28 and movement of the shift fork 36 in the second direction engages the shift fork arm 57 with the flange 74 of the second shift collar 30. In at least some implementations, the motor 43 may be actuated to move, via the drive member 44 and shift fork 36, one shift collar 28 or 30 at a time to a desired position, and each shift collar 28, 30 may have two or more positions, as described in more detail below.

Figure 3:
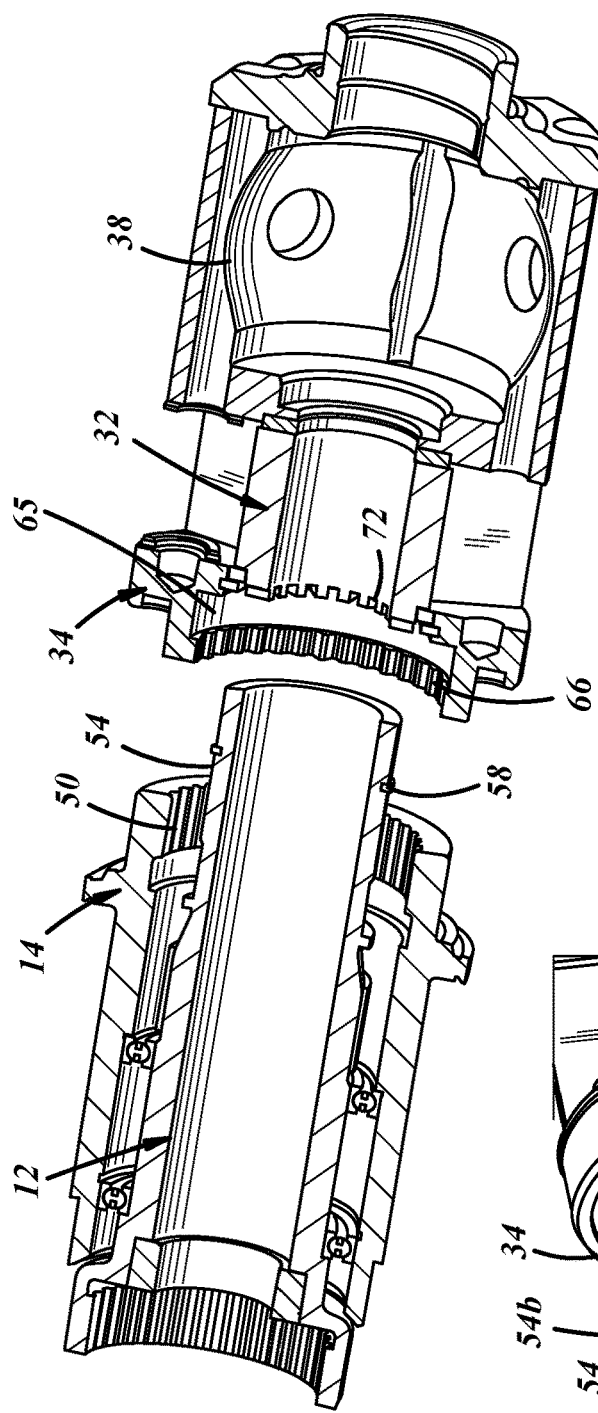
FIG. 3 is a cross-sectional view of the PTU assembly of FIG. 1 taken along line 2-2 in FIG. 1 with certain components removed to better illustrate selected components.
Figure 4:
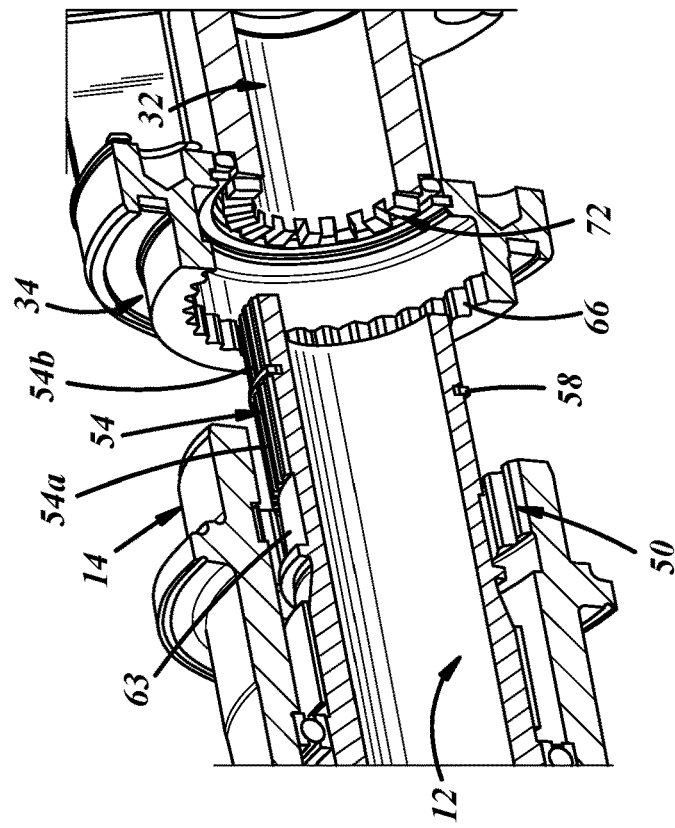
FIG. 4 is a cross-sectional view of part of the PTU assembly with certain components removed to illustrate selected components.
Figure 5:
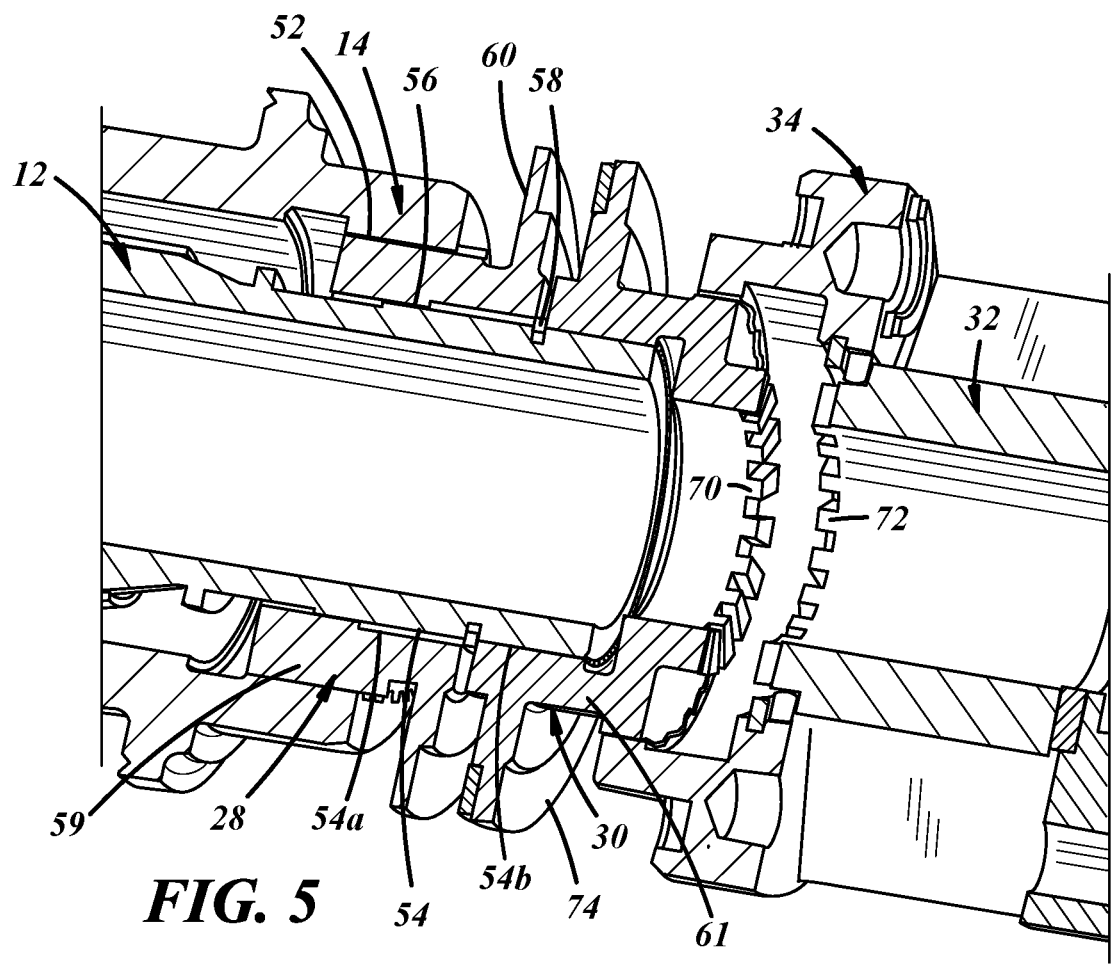
FIG. 5 is a cross-sectional view of part of the PTU assembly with certain components removed to illustrate selected components.

Referring to FIGS. 2-6, the proximal shift collar 28 is selectively engaged with the intermediate shaft 14. In FIGS. 3 and 4, it is noted that the proximal shift collar 28, the distal shift collar 30, and the shift fork 36, inter alia, are removed to better show selected components. For example, the intermediate shaft 14 may include a first portion having one or more coupling surfaces, such as inner splines 50 (FIGS. 3 and 4), on an inner surface of the intermediate shaft 14, and the proximal shift collar 28 may include a second portion having one or more coupling surfaces, such as outer splines 52 (best seen in FIG. 6), arranged to be engaged with the inner splines 50, as shown in FIG. 5. In other implementations, the proximal shift collar 28 may be engaged with the intermediate shaft 14 via a keyed connection or any other suitable connection. The proximal shift collar 28 may be rotationally coupled with the intermediate shaft 14. That is, the intermediate shaft 14 may rotate with the proximal shift collar 28 via the engagement of the inner splines 50 and the outer splines 52. The proximal shift collar 28 may extend at least partially between the intermediate shaft 14 and the input shaft 12 and may be movable relative to and selectively engageable with the input shaft 12.

With continued reference to FIGS. 2-6, the proximal (sometimes called a first) shift collar 28 is selectively engageable with the input shaft 12, and when engaged, the first shift collar 28 and input shaft 12 co-rotate, that is, they rotate together. For example, the input shaft 12 may include a first portion having one or more coupling surfaces, such as outer splines 54 (best seen in FIG. 4) on an outer surface of the input shaft 12, and the proximal shift collar 28 may include a first portion having one or more coupling surfaces, such as inner splines 56 (best seen in FIG. 6), selectively meshingly or otherwise engaged with the outer splines 54, as shown in FIG. 5. In some implementations, the input shaft 12 includes a retainer 58 that separates the outer splines 54 into a proximal or first portion 54a and a distal or second portion 54b, as shown in FIG. 4. In other implementations, the outer splines 54 extend continuously to a distal or second end of the input shaft 12. The inner splines 56 of the proximal shift collar 28 may be selectively meshingly or otherwise engaged with the proximal portion 54a of the outer spline 54. In some implementations, the proximal shift collar 28 may be selectively engaged with the input shaft 12 via a keyed connection or any other suitable connection. The input shaft 12 has a circumferential pocket 63 (FIG. 4) or other area without splines such that the splines 56 of the proximal shift collar 28 do not engage the input shaft 12 in at least one position of the proximal shift collar 28, as set forth in more detail below.

Figure 6:
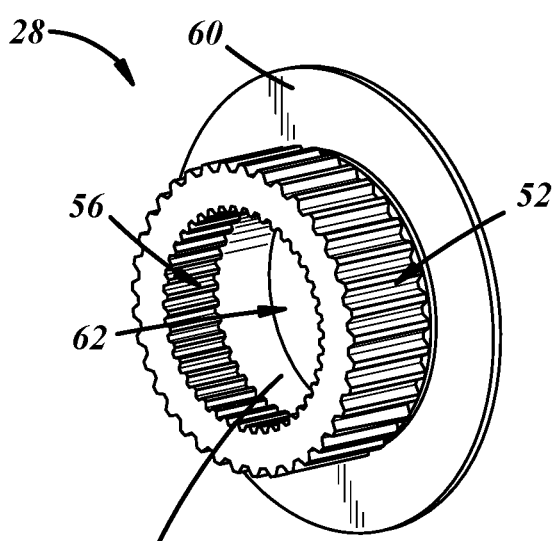
FIG. 6 is a front perspective view of a first shift collar of the PTU assembly of FIG. 1.

Referring to FIG. 6, the proximal shift collar 28 includes the outer splines 52 on an outer surface of a tubular body 59 of the proximal shift collar 28 and the inner splines 56 on a surface opposite the outer surface (i.e., an inner surface of the tubular body). The proximal shift collar 28 includes a flange 60 that extends radially outward from the tubular body 59 and which may be located at or near a distal end of the proximal shift collar 28. The proximal shift collar 28 defines an aperture 62 extending through the tubular body 59 and the flange 60, and configured to receive the input shaft 12. In at least some implementations, the tubular body 59 of the first shift collar 28 may be received at least partially between the input shaft 12 and the intermediate shaft 14, and the first shift collar 28 moves axially relative to the input shaft 12 and the intermediate shaft 14 between different positions of the first shift collar, as set forth below.

As shown in FIGS. 2 and 5, the distal (sometimes called a second) shift collar 30 is selectively engagable with the input shaft 12. For example, the distal shift collar 30 may include a first portion having one or more coupling surfaces, such as inner splines 64 (best seen in FIG. 7A) on an inner surface of the distal shift collar 30 that are meshingly-engaged with the outer splines 54 of the input shaft 12, e.g., the distal portion 54b of the outer splines 54. In other implementations, the distal shift collar 30 may be selectively engaged and coupled with the input shaft 12 via a keyed connection or any other suitable connection. That is, the input shaft 12 may rotate with the distal shift collar 30 via the engagement of the outer splines 54 and the inner splines 64. The distal shift collar 30 may extend at least partially between the input shaft 12 and the peripheral shaft 34 and may be selectively engageable with the peripheral shaft 34.

With continued reference to FIGS. 2-5, 7A, and 7B, the distal shift collar 30 is selectively engageable with the peripheral shaft 34. For example, the peripheral shaft 34 may include a portion having one or more coupling surfaces, such as inner splines 66 (best seen in FIG. 4), on an inner surface of the peripheral shaft 34, and the distal shift collar 30 may include a second portion having one or more coupling surfaces, such as outer splines 68 (best seen in FIG. 7B), selectively meshingly-engaged with the inner splines 66, as shown in FIG. 5. The peripheral shaft 34 may have a circumferential pocket 65 (FIG. 3) or other area without splines (or other connection feature) such that the splines 68 of the distal shifting collar 30 does not engage the peripheral shaft 34 in at least one position of the distal shifting collar 30. In other implementations, the distal shift collar 30 may be engaged with the peripheral shaft 34 via a keyed connection or any other suitable connection.

With continued reference to FIGS. 2-5, 7A, and 7B, the distal shift collar 30 is selectively engageable with the central shaft 32. For example, the distal shift collar 30 may include a third portion having one or more coupling surfaces, such as first face spline 70 providing axially extending teeth at a distal end of the distal shift collar 30, and the central shaft 32 may include a portion having one or more coupling surfaces, such as second face spline 72 including axially extending teeth at a proximal end of the central shaft 32 that are meshingly-engageable with the teeth of the first face spline 70. In other implementations, the one or more coupling surface of the distal shift collar 30 that are configured to engage the central shaft 32 may be on an outer surface of the distal shift collar and the corresponding one or more coupling surfaces of the central shaft may be on an inner surface of the central shaft 32.

Figure 7A:
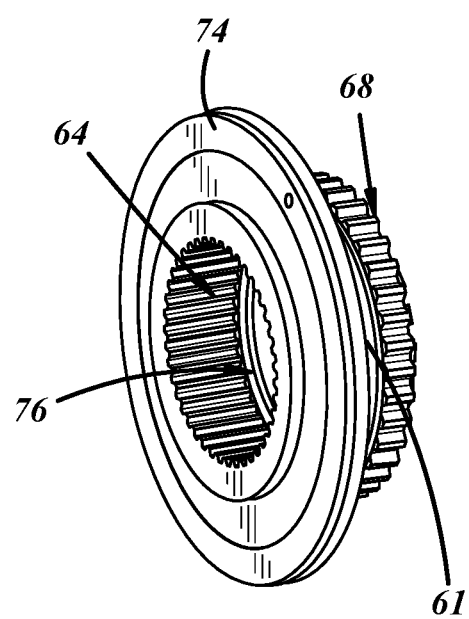
FIG. 7A is a front perspective view of a second shift collar of the PTU assembly of FIG. 1.
Figure 7B:
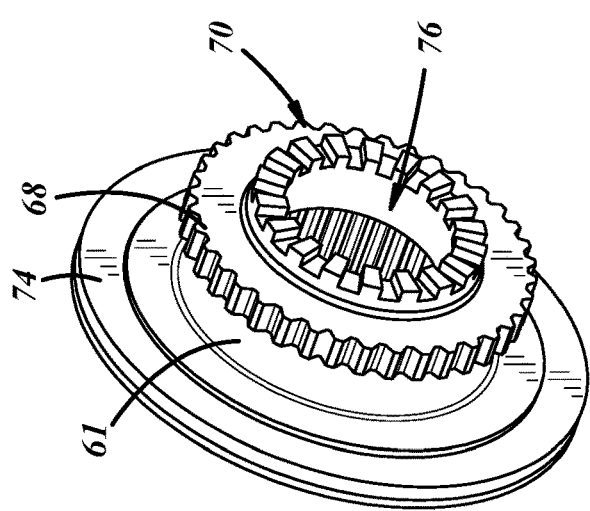
FIG. 7B is a rear perspective view of a second shift collar of the PTU assembly of FIG. 1.
Figure 8:
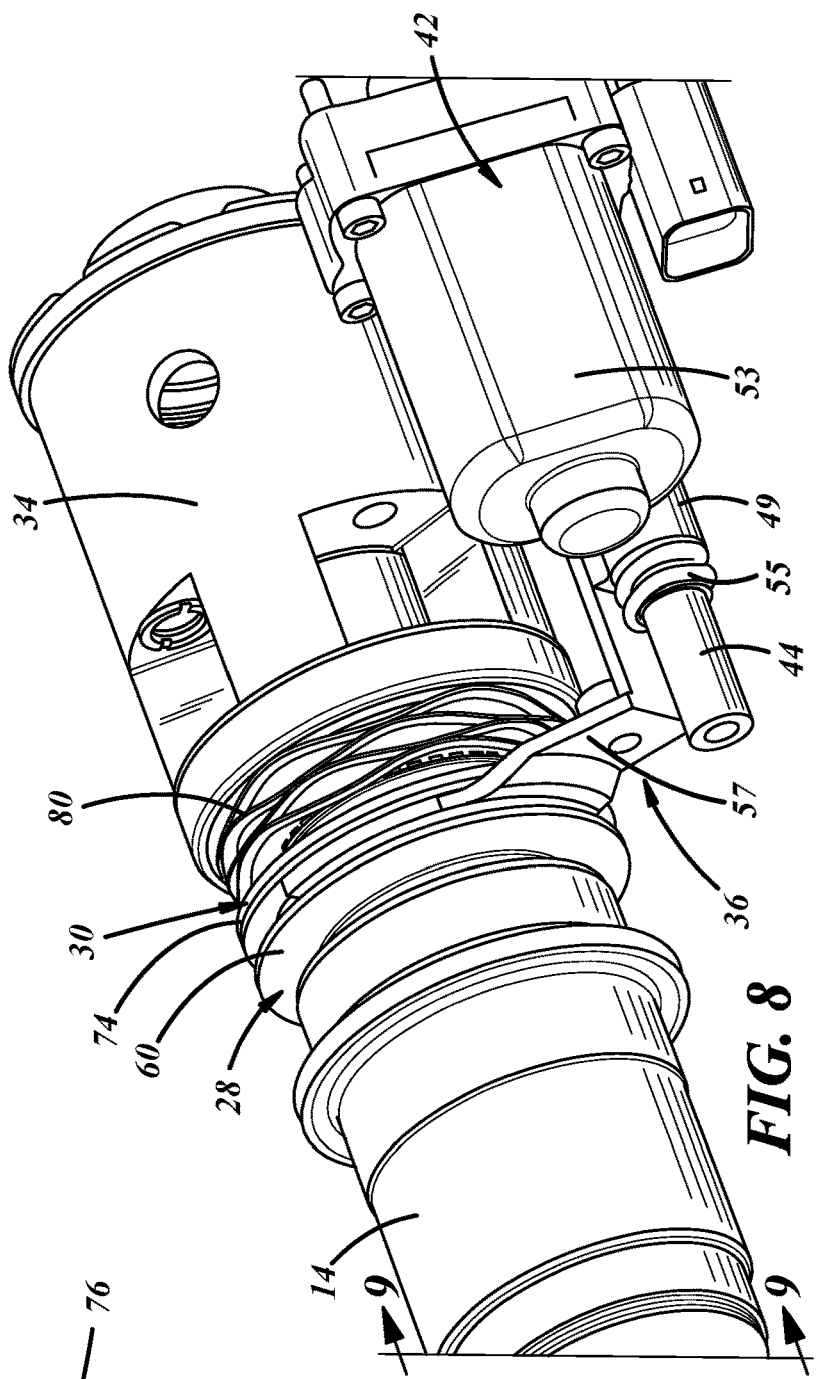
FIG. 8 is a perspective view of a PTU assembly including one shift fork and an actuator.

Referring to FIGS. 7A and 7B, the distal shift collar 30 includes the inner splines 64 on the inner surface of a tubular body 61 of the distal shift collar 30 and the outer splines 68 on a surface opposite the inner surface (i.e., an outer surface of the tubular body 61). The distal shift collar 30 includes a flange 74 that extends radially outward from the tubular body 61 and that may be positioned at or near a proximal end of the distal shift collar 30. The distal shift collar 30 defines an aperture 76 extending through the tubular body 61 and the flange 74 and configured to receive the input shaft 12. In at least some implementations, the tubular body 61 of the second shift collar 30 may be received at least partially between the input shaft 12 and the peripheral shaft 34, and the second shift collar 30 moves axially relative to the input shaft 12 and the peripheral shaft 34 and the central shaft 32, between different positions of the second shift collar 30, as set forth below.

Referring to FIGS. 8-12, the PTU assembly 10 includes a first or proximal spring 78 and a second or distal spring 80. The proximal spring 78 is disposed around the input shaft 12, may be between the input shaft 12 and the intermediate shaft 14, and provides a force on the proximal shift collar 28. The distal spring 80 is disposed around a portion of the peripheral shaft 34 and provides a force on the distal shift collar 30.

With continued reference to FIGS. 8-12, the shift fork 36 is operable to move back and forth along a direction parallel to the central axis $A_{12}$ to shift the proximal shift collar 28 and the distal shift collar 30. The proximal shift collar 28 and the distal shift collar 30 are operable between a first position (FIGS. 8, 9A, and 9B) referred to as two-wheel high or 2H, a second position (FIG. 10) referred to as four-wheel high or 4H, a third position (FIG. 11) referred to as neutral, and a fourth position (FIG. 12) referred to as four-wheel low or 4L.

Referring to FIGS. 9A and 9B, in the first position (two-wheel high), the shift fork 36 (via the motor 42 and the drive member 44) shifts the proximal shift collar 28 away from the retainer 58, compressing the proximal spring 78, and the distal shift collar 30 abuts the retainer 58 via the force exerted on the distal shift collar 30 by the distal spring 80. The outer splines 54 of the input shaft 12 (i.e., the proximal portion 54a of the input shaft 12) are disengaged from the inner splines 56 of the proximal shift collar 28, the outer splines 52 of the proximal shift collar 28 are engaged with the inner splines 50 of the intermediate shaft 14, the inner splines 64 of the distal shift collar 30 are engaged with the outer splines 54 of the input shaft 12 (i.e., the distal portion 54b of the input shaft 12), the outer splines 68 of the distal shift collar 30 are engaged with the inner splines 66 of the peripheral shaft 34, and the first face spline 70 of the distal shift collar 30 is not engaged with the second face spline 72 of the central shaft 32. In the first position, torque from the input shaft 12 is transferred to the first set of wheels through the distal shift collar 30 and the peripheral shaft 34.

Figure 10:
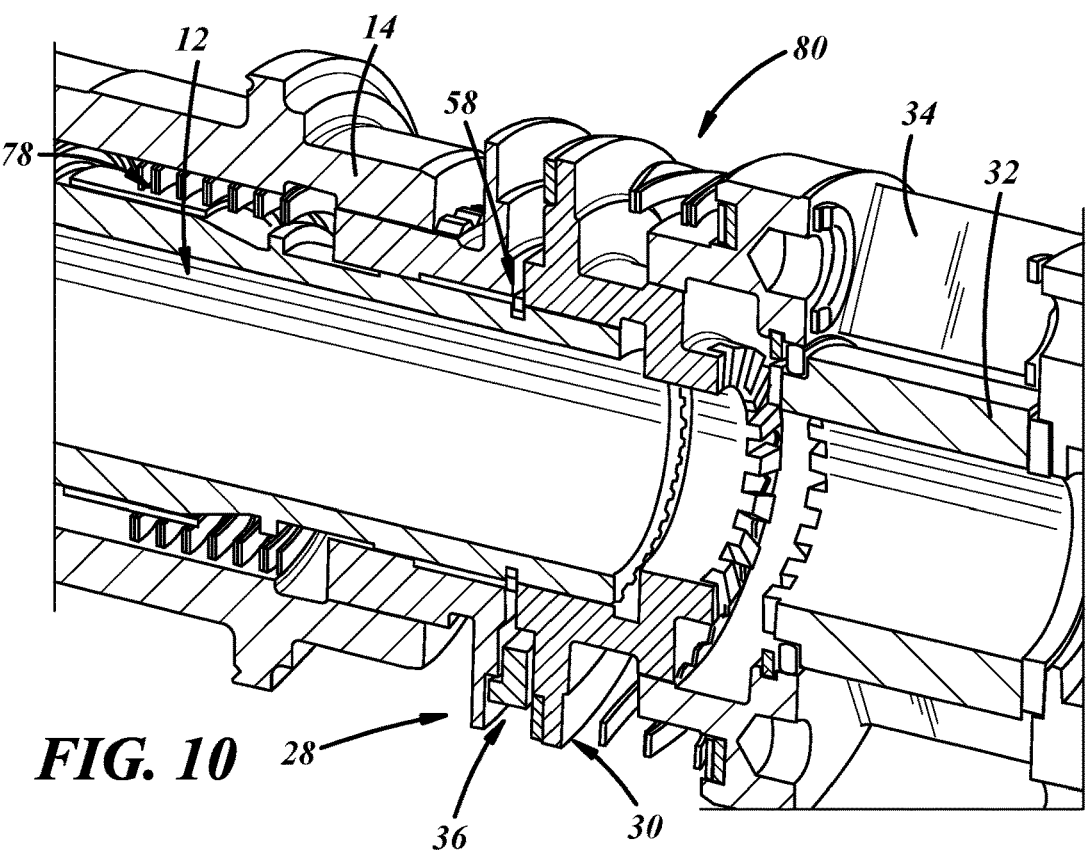
FIG. 10 is a cross-section view of part of the PTU assembly of FIG. 8 in a second position with certain components removed to illustrate selected components.

Referring to FIG. 10, in the second position (four-wheel high), the shift fork 36 does not displace either shift collar 28 or 30 and the proximal shift collar 28 and the distal shift collar 30 each abut the retainer 58 via the opposing forces exerted on the shift collars 28, 30 by the springs 78, 80. The outer splines 54 of the input shaft 12 (i.e., the proximal portion 54a of the input shaft 12) are engaged with the inner splines 56 of the proximal shift collar 28, the outer splines 52 of the proximal shift collar 28 are engaged with the inner splines 50 of the intermediate shaft 14, the inner splines 64 of the distal shift collar 30 are engaged with the outer splines 54 of the input shaft 12 (i.e., the distal portion 54b of the input shaft 12), the outer splines 68 of the distal shift collar 30 are engaged with the inner splines 66 of the peripheral shaft 34, and the first face spline 70 of the distal shift collar 30 is not engaged with the second face spline 72 of the central shaft 32. In the second position, torque from the input shaft 12 is transferred through the proximal shift collar 28, the intermediate shaft 14, the ring gear 16, the output gear 18, and to the second set of wheels 22. Torque is also transferred from the input shaft 12 to the first set of wheels through the distal shift collar 30 and the peripheral shaft 34.

Figure 11:
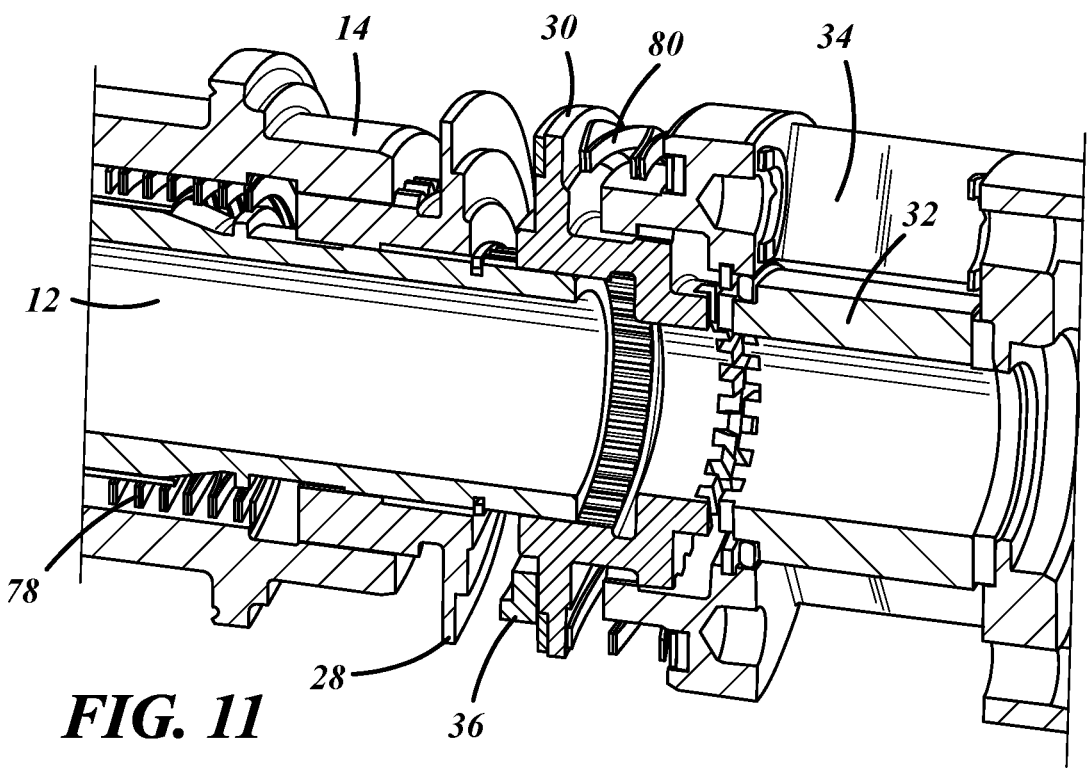
FIG. 11 is a cross-section view of part of the PTU assembly of FIG. 8 in a third position with certain components removed to illustrate selected components.

Referring to FIG. 11, in the third position (neutral), the shift fork 36 (via the motor 42 and the drive member 44) shifts the distal shift collar 30 away from the retainer 58 a first distance, compressing the distal spring 80, and the proximal shift collar 28 abuts the retainer 58 via the force exerted on the proximal shift collar 28 by the proximal spring 78. The outer splines 54 of the input shaft 12 (i.e., the proximal portion 54a of the input shaft 12) are engaged with the inner splines 56 of the proximal shift collar 28, the outer splines 52 of the proximal shift collar 28 are engaged with the inner splines 50 of the intermediate shaft 14, the inner splines 64 of the distal shift collar 30 are engaged with the outer splines 54 of the input shaft 12 (i.e., the distal portion 54b of the input shaft 12), the outer splines 68 of the distal shift collar 30 are not engaged with the inner splines 66 of the peripheral shaft 34, and the first face spline 70 of the distal shift collar 30 is not engaged with the second face spline 72 of the central shaft 32. In the third position, torque from the input shaft 12 is not transferred to any of the wheels.

Figure 12:
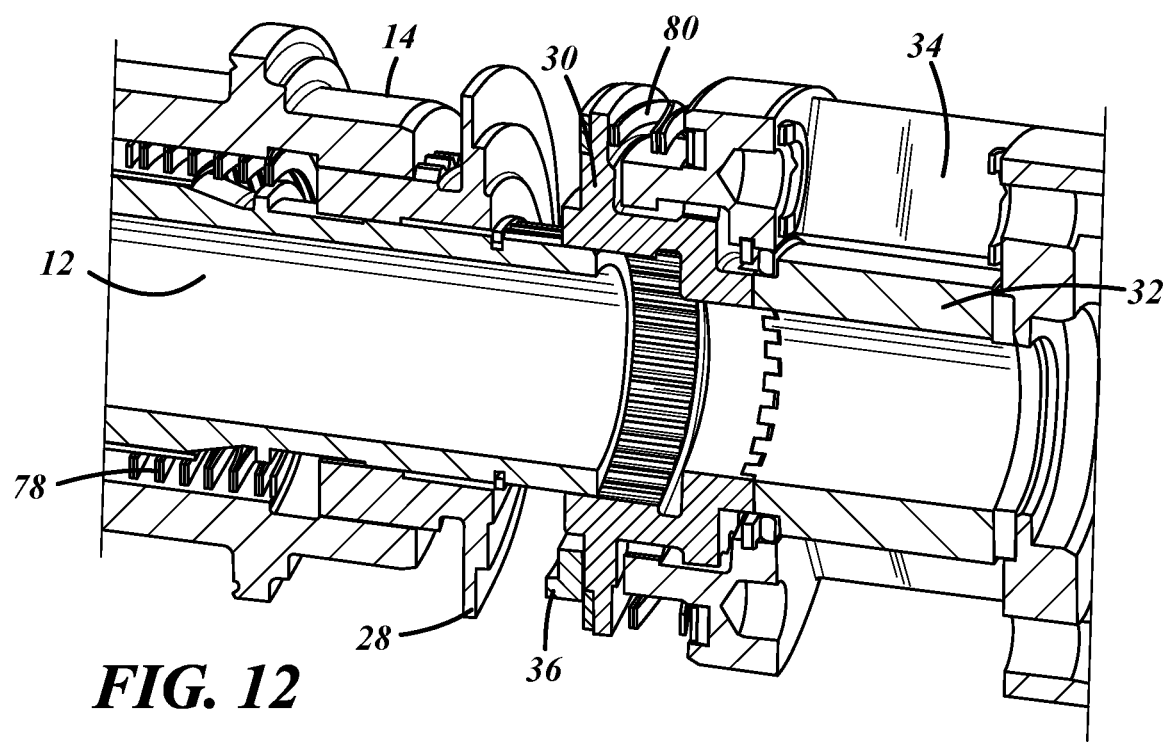
FIG. 12 is a cross-section view of part of the PTU assembly of FIG. 8 in a fourth position with certain components removed to illustrate selected components.

Referring to FIG. 12, in the fourth position (four-wheel low), the shift fork 36 (via the motor 42 and the drive member 44) shifts the distal shift collar 30 away from the retainer 58 a second distance greater than the first distance against the force of the distal spring 80, and the proximal shift collar 28 abuts the retainer 58 via the force exerted on the proximal shift collar 28 by the proximal spring 78. The outer splines 54 of the input shaft 12 (i.e., the proximal portion 54a of the input shaft 12) are engaged with the inner splines 56 of the proximal shift collar 28, the outer splines 52 of the proximal shift collar 28 are engaged with the inner splines 50 of the intermediate shaft 14, the inner splines 64 of the distal shift collar 30 are engaged with the outer splines 54 of the input shaft 12 (i.e., the distal portion 54b of the input shaft 12), the outer splines 68 of the distal shift collar 30 are not engaged with the inner splines 66 of the peripheral shaft 34, and the first face spline 70 of the distal shift collar 30 is engaged with the second face spline 72 of the central shaft 32. In the fourth position, torque from the input shaft 12 is transferred through the proximal shift collar 28, the intermediate shaft 14, the ring gear 16, the output gear 18, and to the second set of wheels 22. Torque is also transferred from the input shaft 12 to the first set of wheels through the distal shift collar 30 and the central shaft 32.

Thus, in the implementation shown, the PTU is operable in four positions or four states, as described above, corresponding to four positions of the shift fork 36, two positions of the first shift collar 28 and three positions of the second shift collar 30. In a first position of the shift fork 36, the first shift collar 28 is held in a first position by the shift fork, against the force of the first spring 78, and the second shift collar 30 is held in a third position by the force of the second spring 80 acting on the second shift collar 30. In a second position of the shift fork 36, the first shift collar 28 is held in a second position by the force of the first spring 78 acting on the first shift collar, the second shift collar 30 is held in the third position by the force of the second spring 80 acting on the second shift collar. In a third position of the shift fork 36, the first shift collar 28 is held in the second position by the force of the first spring 78 acting on the first shift collar, and the second shift collar 30 is held in a fourth position by the shift fork 36 and the second spring 80 is compressed by the movement of the second shift collar caused by the shift fork. In a fourth position of the shift fork 36, the first shift collar 28 is held in the second position by the force of the first spring 78 acting on the first shift collar, and the second shift collar 30 is held in a fifth position by the shift fork 36 and the second spring 80 is further compressed (compared to when the second shift collar 30 is in the fourth position) by the movement of the second shift collar caused by the shift fork.

More or fewer positions may be possible to couple for co-rotation shafts as desired. From the multiple positions of the shift fork 36, various shafts may be selectively coupled together for co-rotation, to transfer torque through the PTU as desired. A single shift fork 36 may be used to move or allow two shift collars 28, 30 to move to at least two positions each. For example, the combination of the shift fork 36 and one or more biasing members 78, 80 may be used to provide multiple positions for each of two shift collars 28, 30.

In at least some implementations, the first shift collar 28 includes a first portion configured to be at least selectively engaged with a first portion of the input shaft, e.g. by engagement of the noted coupling surfaces 56, 54, and the first shift collar includes a second portion configured to be at least selectively engaged with a first portion of the intermediate shaft, e.g. by engagement of the noted coupling surfaces 52, 50, respectively. In at least some implementations, the second shift collar includes a first portion configured to at least selectively engage a portion of the input shaft, such as by engagement of the noted coupling surfaces 64, 54, and a second portion configured to at least selectively engage a portion of the peripheral shaft, such as by engagement of the noted coupling surfaces 68, 66. And the second shift collar may include a third portion configured to be selectively engaged with a portion of the central shaft, such as by engagement of the noted coupling surfaces 70, 72. As used herein, the phrase "at least selectively engaged" means that the noted coupling surfaces between a shift collar and a shaft could remain engaged in two positions of a shift collar, while another portion of the shift collar is engaged/disengaged from a different shaft. For example, the second shift collar in the illustrated embodiment may remain coupled to the input shaft and may be coupled to neither or one or the other of the intermediate shaft 34 and central shaft 32. In other embodiments, it may be possible to disconnect the coupling surface(s) of the second shift collar from coupling surface(s) of the input shaft, for example, in a neutral position.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed herein could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle power transfer unit assembly, comprising:
   an input shaft;
   an intermediate shaft at least partially surrounding the input shaft;
   a central shaft adjacent the input shaft;
   a peripheral shaft at least partially surrounding the central shaft;
   a first shift collar operable between a first position where torque is transferred from the input shaft to the intermediate shaft and a second position where torque is not transferred from the input shaft to the intermediate shaft;
   a second shift collar operable between a third position where torque is transferred from the input shaft to the peripheral shaft and a fourth position where torque is transferred from the input shaft to the central shaft; and
   a shift fork that is movable to shift the first shift collar to at least one of the first position and the second position, and the shift fork is movable to shift the second shift collar to at least one of the third position and the fourth position.

2. The vehicle power transfer unit assembly of claim 1, further comprising an actuator that moves or causes movement of the shift fork in two directions.

3. The vehicle power transfer unit assembly of claim 2, wherein the actuator includes a motor that rotates an output shaft, and a drive member that is coupled to the output shaft to linearly move the shift fork in at least one of the two directions.

4. The vehicle power transfer unit assembly of claim 3, further comprising a first spring configured to bias the first shift collar toward the first position and a second spring configured to bias the second shift collar toward the third position, wherein the shift fork selectively moves the first shift collar to the second position against the force of the first spring on the first shift collar, and the shift fork selectively moves the second shift collar to the fourth position against the force of the second spring on the second shift collar.

5. The vehicle power transfer unit assembly of claim 3, wherein the first shift collar includes (i) a first portion having one or more coupling surfaces configured to engage with one or more coupling surfaces on a portion of the input shaft to couple for co-rotation the first shift collar with the input shaft, and (ii) a second portion having one or more coupling surfaces configured to engage with one or more coupling surfaces on a portion of the intermediate shaft to couple for co-rotation the first shift collar with the intermediate shaft.

6. The vehicle power transfer unit assembly of claim 5, wherein the second shift collar includes (i) a first portion having one or more coupling surfaces configured to engage with one or more coupling surfaces on a portion of the input shaft to couple for co-rotation the second shift collar and the input shaft and (ii) a second portion having one or more coupling surfaces configured to engage with one or more coupling surfaces on a portion of the peripheral shaft to couple for co-rotation the second shift collar with the peripheral shaft.

7. The vehicle power transfer unit assembly of claim 6, wherein the second shift collar includes a third portion having one or more coupling surfaces at a distal end of the second shift collar configured to engage with one or more coupling surfaces on a portion of the central shaft to couple for co-rotation the second shift collar with the central shaft.

8. The vehicle power transfer unit assembly of claim 1, further comprising a first spring configured to bias the first shift collar toward the first position and a second spring configured to bias the second shift collar toward the third position.

9. The vehicle power transfer unit assembly of claim 1, wherein the first shift collar includes (i) a first portion configured to selectively be engaged with a first portion of the input shaft and (ii) a second portion configured to selectively be engaged with a first portion of the intermediate shaft.

10. The vehicle power transfer unit assembly of claim 9, wherein the second shift collar includes (i) a first portion configured to engage with a portion of the input shaft and (ii) a second portion configured to selectively be engaged with a portion of the peripheral shaft.

11. The vehicle power transfer unit assembly of claim 10, wherein the second shift collar includes a third portion configured to be selectively engaged with a portion of the central shaft.

12. A vehicle power transfer unit assembly, comprising:
    an input shaft configured to receive a torque;
    an intermediate shaft surrounding at least part of the input shaft;
    a central shaft adjacent the input shaft and configured to transfer the torque to a differential gear assembly;

a peripheral shaft surrounding at least part of the central shaft and configured to transfer the torque to the differential gear assembly;

a first shift collar operable between a first position where the torque is transferred from the input shaft to the intermediate shaft via the first shift collar and a second position where the torque is not transferred from the input shaft to the intermediate shaft via the first shift collar;

a second shift collar operable between a third position where the torque is transferred from the input shaft to the peripheral shaft via the second shift collar and a fourth position where torque is transferred from the input shaft to the central shaft via the second shift collar; and a shift fork movable relative to the first shift collar and the second shift collar, the shift fork operable to move the first shift collar between the first position and the second position and to move the second shift collar between the third position and the fourth position.

13. The vehicle power transfer unit assembly of claim 12, further comprising an actuator that moves the shift fork relative to the first shift collar and the second shift collar.

14. A vehicle power transfer unit assembly, comprising:
an input shaft configured to receive a torque;
an intermediate shaft surrounding at least part of the input shaft;
a central shaft adjacent the input shaft;
a peripheral shaft surrounding at least part of the central shaft;
a first shift collar having a first position wherein the first shift collar is coupled for co-rotation to both the input shaft and the intermediate shaft, and the first shift collar having a second position wherein the first shift collar is not coupled to both the input shaft and the intermediate shaft such that the input shaft and intermediate shaft are not co-rotated via a coupling by the first shift collar when the first shift collar is in the second position;
a second shift collar having a third position wherein the second shift collar is coupled for co-rotation to both the input shaft and the peripheral shaft, and the second shift collar having a fourth position wherein the second shift collar is coupled for co-rotation to both the input shaft and the central shaft;
an actuator; and
a shift fork driven by the actuator relative to the first shift collar and the second shift collar to move the first shift collar to and between the first position and the second position and to move the second shift collar to and between the third position and the fourth position.

15. The vehicle power transfer unit assembly of claim 14, wherein the shift fork has at least one position in which the shift fork engages the first shift collar but not the second shift collar, and the shift fork has at least one other position in which the shift fork engages the second shift collar but not the first shift collar.

16. The vehicle power transfer unit assembly of claim 15, further including a first spring that biases the first shift collar toward the first position, and a second spring that biases the second shift collar toward the third position.

17. The vehicle power transfer unit assembly of claim 14, wherein a portion of the shift fork is received between the first shift collar and the second shift collar, and the actuator moves the shift fork in a first direction to change the position of the first shift collar, and the actuator moves the shift fork in a second direction to change the position of the second shift collar.

18. The vehicle power transfer unit assembly of claim 14, wherein the actuator includes a motor that rotates an output shaft and a coupling between the output shaft and the shift fork, wherein the coupling translates rotary motion of the output shaft to linear motion to linearly drive the shift fork.

19. The vehicle power transfer unit of claim 18, wherein the output shaft includes a threaded portion and the coupling includes a drive shaft having a threaded portion engaged with the threaded portion of the output shaft so that rotation of the output shaft in a first direction moves the drive shaft away from the motor, and rotation of the output shaft in a second direction moves the drive shaft toward the motor.

* * * * *